United States Patent
Yoshimi et al.

(10) Patent No.: US 7,340,227 B2
(45) Date of Patent: Mar. 4, 2008

(54) WIRELESS COMMUNICATION SYSTEM AND SEMICONDUCTOR INTEGRATED CIRCUIT

(75) Inventors: Daisuke Yoshimi, Takasaki (JP); Akio Yamamoto, Hiratsuka (JP); Yutaka Igarashi, Yokohama (JP)

(73) Assignee: Renesas Technology Corp., Tokyo (JP)

( * ) Notice: Subject to any disclaimer, the term of this patent is extended or adjusted under 35 U.S.C. 154(b) by 414 days.

(21) Appl. No.: 11/154,665

(22) Filed: Jun. 17, 2005

(65) Prior Publication Data
US 2005/0287966 A1    Dec. 29, 2005

(30) Foreign Application Priority Data
Jun. 24, 2004  (JP) ............... 2004-186039

(51) Int. Cl.
*H01Q 11/12* (2006.01)
*H04B 7/00* (2006.01)
*G06F 7/556* (2006.01)

(52) U.S. Cl. .................. 455/127.1; 327/350; 327/351; 327/352

(58) Field of Classification Search ............. 455/127.1; 327/350–352
See application file for complete search history.

(56) References Cited

U.S. PATENT DOCUMENTS 5,319,264 A * 6/1994 Kimura ................. 327/352
5,471,166 A * 11/1995 Kimura ................. 327/351
5,506,537 A * 4/1996 Kimura ................. 327/351
5,631,594 A * 5/1997 Kimura ................. 327/351

FOREIGN PATENT DOCUMENTS

JP    2000-151310    5/2000

* cited by examiner

*Primary Examiner*—Duc M. Nguyen
*Assistant Examiner*—David Wang
(74) *Attorney, Agent, or Firm*—Mattingly, Stanger, Malur & Brundidge, PC

(57) ABSTRACT

A wireless communication system uses a transmission power detection circuit. The transmission power detection circuit has excellent linearity of detection output for transmission output power and can obtain detection output not having temperature dependence. The transmission power detection circuit has a rectifying detection part that includes plural amplifiers connected in series and obtains detection output by taking out rectified outputs from emitters of input transistors of amplifiers of individual stages and synthesizing them. A compensation voltage generating circuit has a dummy amplifier having a construction similar to the amplifiers constituting the rectifying detection part and a coefficient circuit that changes output of the dummy amplifier at a specified ratio, and generates voltage for compensating temperature characteristics. Also included is an addition/subtraction circuit that obtains detection output free of temperature dependence by subtracting compensation voltage generated in the compensation voltage generating circuit from output voltage of the rectifying detection part.

17 Claims, 8 Drawing Sheets

OUTPUT POWER OF TRANSMISSION
POWER AMPLIFIER [dBm]

WIRELESS COMMUNICATION SYSTEM AND SEMICONDUCTOR INTEGRATED CIRCUIT

CROSS-REFERENCE TO RELATED APPLICATION

The present application claims priority from Japanese paten application No. 2004-186039 filed on Jun. 24, 2004, the content of which is hereby incorporated by reference into this application.

BACKGROUND OF THE INVENTION

The present invention relates to technology suitably applied to a detection circuit that is used in wireless communication systems such as cellular phones and detects power of transmission output, and more particularly to technology suitably applied to an output power detection circuit in a wireless communication system that controls output power so as not to exceed specified maximum transmission power.

Generally, a transmission output part in wireless communication devices (mobile communication devices) such as cellular phones is provided with a radio frequency power amplifier circuit that amplifies a modulated transmission signal. In the wireless communication devices, control is performed so that desired transmission power is obtained by control signals from a baseband circuit or a control circuit of a microprocessor or the like.

In wireless communication devices of the GSM (Global System for Mobile Communication) system, such transmission power control is performed by providing an APC circuit and applying a feedback to a radio frequency power amplifier. The APC circuit generates a control signal for controlling the gain of the radio frequency power amplifier by detecting output power from the radio frequency power amplifier and comparing an output level indication signal Vramp from a control circuit such as a baseband circuit and detection output from an output power detection circuit (see Japanese Unexamined Patent Publication 2000-151310).

On the other hand, in wireless communication devices of the CDMA (Code Division Multiple Access) system, limiter control is performed which controls transmission power by detecting output power of a radio frequency power amplifier and outputting a limit signal from a control circuit such as a baseband circuit so as not to exceed maximum transmission power. Generally, conventional wireless communication devices of the CDMA often perform transmission control by controlling the gain of a variable gain amplifier within a transmitting circuit (RF-IC) for modulation and up-conversion that while keeping the gain of a radio frequency power amplifier constant, generates an input signal of the radio frequency power amplifier. Also in such wireless communication devices of the CDMA system, a detection circuit is required which detects the power of transmission output to perform the above-mentioned limiter control.

SUMMARY OF THE INVENTION

In wireless communication devices of the CDMA system, to correctly perform limiter control so that transmission output does not exceed maximum transmission power, it is important that while the linearity of detection output to transmission power in a transmission power detection circuit is satisfactory, the output of a detection circuit has no temperature dependence.

To design a transmission power detection circuit having excellent linearity of detection output, the present inventors studied a detection circuit having a construction as shown in FIG. 13 in which amplifiers having a construction as shown in FIG. 12 are multistage-connected. A detection circuit having one stage of the amplifier shown in FIG. 12 exhibits excellent linearity only in a narrow range, while a detection circuit having multistage-connected amplifiers as shown in FIG. 13 exhibits excellent linearity in a wide range.

On the other hand, in the amplifier shown in FIG. 12, by giving a proper temperature characteristic to the reference current Iref, the output of the detection circuit can be freed of temperature characteristic. However, in the detection circuit as shown in FIG. 13 that uses the amplifier shown in FIG. 12, to further increase the linearity of output, it is effective to change resistance values of collector resistors among the different stages of the amplifiers. However, since changing resistance values of collector resistors causes the temperature characteristics of the amplifiers to be different in each of the stages, the temperature characteristic of a constant current source must be changed for each of the stages of the amplifiers.

Therefore, with the detection circuit as shown in FIG. 13, the design of temperature characteristic given to the constant current source is difficult. If the temperature characteristic of the constant current source can be the same among the stages of the amplifiers, the constant current source can be used in common among the stages of the amplifiers, and an operating current can be supplied to the stages of the amplifiers by a current mirror circuit. On the other hand, changing the temperature characteristic of the constant current source for each of the stages of the amplifiers would heavily load the design and require a different constant current source for each of stages of the amplifiers. As a result, current consumption as the entire detection circuit would increase.

An object of the present invention is to provide a transmission power detection circuit that has excellent linearity of detection output for transmission output power and can obtain detection output not having temperature dependence, and a wireless communication system using the transmission power detection circuit.

Another object of the present invention is to provide a transmission power detection circuit that has desired characteristics and requires a small amount of current consumption, and a wireless communication system using it.

Another object of the present invention is to provide a wireless communication system that can correctly perform restrictor control that prevents transmission output from exceeding maximum transmission power, and a transmission power detection circuit suitable for wireless communication systems that perform restrictor control.

The above-mentioned and other objects and novel characteristics of the present invention will become apparent from the description of this specification and the accompanying drawings.

The typical disclosures of the invention will be summarized in brief as follows.

A transmission power detection circuit of the present invention comprises: a rectifying detection part that comprises plural amplifiers each comprising bipolar transistors connected in series and obtains detection output by taking out rectified outputs from emitters of input transistors of amplifiers of individual stages and synthesizing them; a compensation voltage generating circuit that comprises a dummy amplifier having a construction similar to the amplifiers constituting the rectifying detection part and a coefficient circuit that changes output of the dummy amplifier at a specified ratio, and generates voltage for compensating temperature characteristics; and a subtraction circuit that obtains detection output free of temperature dependence by subtracting compensation voltage generated in the compensation voltage generating circuit from output voltage of the rectifying detection part.

According to an above-mentioned means, when the characteristics of the amplifiers constituting the rectifying detection part change due to temperature fluctuation, the characteristic of the dummy amplifier changes in the same way. Therefore, detection output free of temperature dependence can be obtained by subtracting compensation voltage generated in the compensation voltage generating circuit having the dummy amplifier from output voltage of the rectifying detection part.

Based on the output of the dummy amplifier having a construction similar to the amplifiers constituting the rectifying detection part, voltage for compensating temperature characteristic is generated and output voltage of the rectifying detection part is compensated. Therefore, compensation can be easily performed without providing complicated and large-scale circuits, and design efforts for temperature compensation can be reduced. Furthermore, since the compensation voltage generating circuit is provided with a coefficient circuit, the deviation of temperature characteristics due to the difference between the number of amplifiers of the rectifying detection part and the number of amplifiers of the compensation voltage generating circuit and can be easily corrected.

Preferably, a constant current source common to the plural amplifiers constituting the rectifying detection part and the dummy amplifier is provided, and transistors supplying a constant current from the constant current source and current transistors of the amplifiers are connected in current mirror to supply an operating current to the amplifiers. By this construction, it becomes unnecessary to provide a constant current source for each of the amplifiers, so that the number of constant current sources can be reduced to reduce current consumption. Furthermore, when resistors are provided that convert rectified output of the plural amplifiers constituting the rectifying detection part into voltage, the temperature dependence of detection output occurring due to the temperature characteristic of the resistors can be corrected by adjusting a coefficient of the coefficient circuit.

Effects obtained by typical disclosures of the invention will be described in brief as follows.

According to the present invention, a transmission power detection circuit can be achieved that has excellent linearity of detection output for transmission output power and can obtain detection output not having temperature dependence, and a wireless communication system using it can be realized.

Furthermore, according to the present invention, there can be realized a wireless communication system that can correctly perform limiter control that prevents transmission output from exceeding maximum transmission power, and a transmission power detection circuit suitable for wireless communication systems that perform limiter control.

DETAILED DESCRIPTION OF THE PREFERRED EMBODIMENTS

A preferred embodiment of the present invention will be described with reference to the accompanying drawings.

Figure 1:
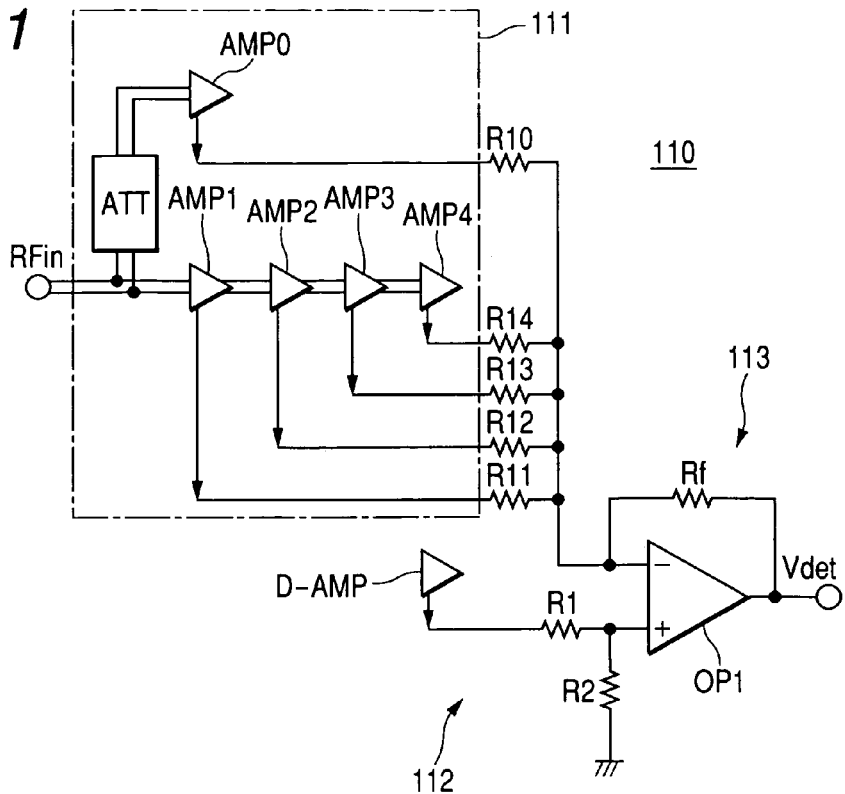
FIG. 1 is a circuit diagram showing an embodiment of a transmission power detection circuit according to the present invention.

FIG. 1 shows an embodiment of a transmission power detection circuit according to the present invention.

The transmission power detection circuit 110 of this embodiment comprises: a rectifying detection part 111 that rectifies and detects an inputted radio frequency signal RFin; a compensation voltage generating circuit 112 that generates voltage for compensating temperature characteristics; and an addition/subtraction circuit 113. The rectifying detection part 111 comprises plural differential amplifiers AMP0 to AMP4 that input a radio frequency signal RFin captured by a coupler or the like from an output side of a radio frequency power amplifier (so-called power amplifier) not shown. The compensation voltage generating circuit 112 comprises a dummy amplifier D-AMP having a construction similar to the differential amplifiers, and a coefficient circuit comprising resistors R1 and R2 that changes output of the dummy amplifier at a specified ratio. The addition/subtraction circuit 113 comprises resistors R11 to R14 that synthesize (add) outputs of the differential amplifiers AMP1 to AMP4 of the rectifying detection part 111, and an operational amplifier OP1 and a feedback resistor Rf that obtains detection output free of temperature dependence by subtracting compensation voltage generated in the compensation voltage generating circuit 112 from the synthesized voltage.

Although there is no particular limitation, the rectifying detection part 111 includes an amplifier train with a multi-stage structure in which four differential amplifiers AMP1 to AMP4 are connected so that their input terminals and output terminals are in series, and a differential amplifier AMP0 placed in parallel to the amplifier train. A radio frequency signal RFin captured by a coupler or the like is inputted to the differential amplifier AMP0 through an attenuator ATT, whereby the characteristic of excellent linearity is obtained in a higher power area than with the differential amplifiers AMP1 to AMP4.

Output of the differential amplifier AMP0 is further added through the resistor R10 to the synthesized output of the differential amplifiers AMP1 to AMP4 synthesized by the resistors R11 to R14. The outputs of the differential amplifiers AMP0 to AMP4 are synthesized at ratios corresponding to resistance ratio between the resistors R10 to R14 respectively connected to their output terminals and the feedback circuit of the addition/subtraction circuit 113.

If the resistors R10 to R14 have identical resistance values, the temperature characteristics of outputs of the differential amplifiers AMP0 to AMP4 becomes identical, and the design of the circuit becomes easy in terms of compensating temperature characteristic, while it is desirable to set the resistors R10 to R14 to values different from each other to increase the linearity of output of the entire detection circuit. Optimum resistance values of the resistors R10 to R14, which are different depending on the circuit constructions and elements of the differential amplifiers AMP0 to AMP4, should be decided based on the constructions and elements of the circuits to obtain satisfactory linearity.

The dummy amplifier D-AMP is opened so that no significant signal is inputted to the input terminal. By this construction, only voltage depending on its own temperature dependence develops in the output of the dummy amplifier D-AMP.

In the transmission power detection circuit 110 of this embodiment, even if the outputs of the differential amplifiers AMP0 to AMP4 of the rectifying detection part 111 have temperature dependence, since the output of the dummy amplifier D-AMP having a construction similar to that of these differential amplifiers has the same temperature dependence, by subtracting the output of the dummy amplifier D-AMP from the synthesized output of the differential amplifiers AMP0 to AMP4, detection output Vdet free of temperature dependence can be obtained.

The differential amplifiers of the rectifying detection part 111 has four stages, while the dummy amplifier of the compensation voltage generating circuit 112 has one stage. As a result, there is some deviation in the temperature characteristics of both. However, in this embodiment, a coefficient circuit (resistors R1 and R2) is provided in a subsequent stage of the dummy amplifier D-AMP and a coefficient of the coefficient circuit is properly adjusted to correct the deviation of temperature characteristics, so that temperature characteristic compensation can be performed with higher accuracy. The coefficient of the coefficient circuit is set according to the number of stages of the amplifier train of the rectifying detection part 111.

Figure 2:
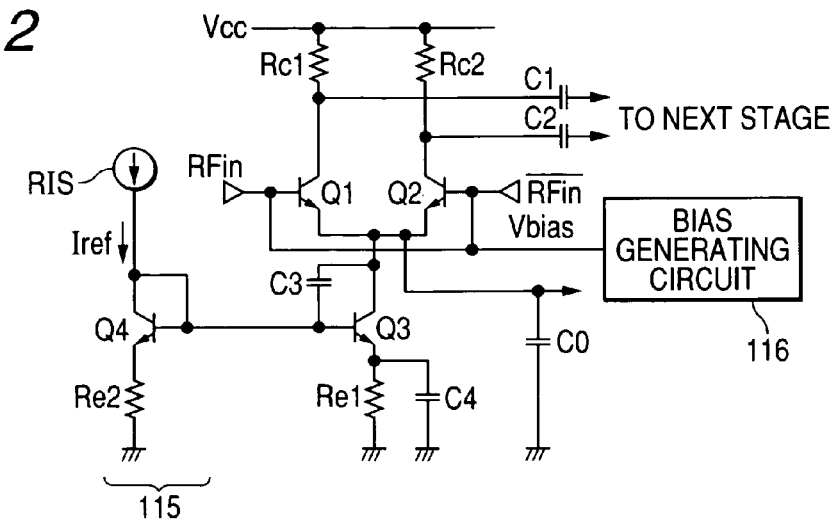
FIG. 2 is a circuit diagram showing a concrete example of a differential amplifier constituting the detection circuit of FIG. 1.
Figure 3:
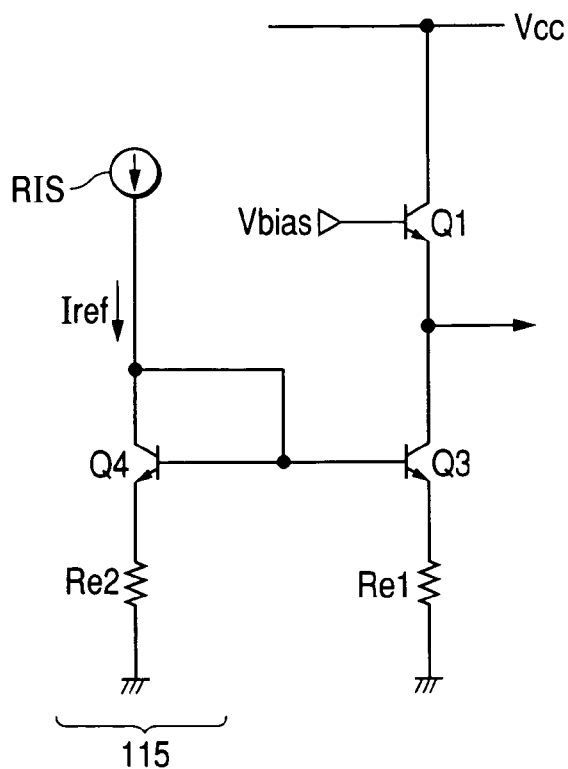
FIG. 3 is a circuit diagram showing a concrete example of a dummy amplifier constituting the detection circuit of FIG. 1.

FIG. 2 shows an example of the construction of the differential amplifiers AMP1 to AMP3 of the rectifying detection part 111 suitable for the detection circuit of the present invention. FIG. 3 shows an example of the construction of the dummy amplifier D-AMP of the compensation voltage generating circuit 112.

As shown in FIG. 2, the differential amplifiers AMP1 to AMP3 in this embodiment comprises: a pair of differential transistors Q1 and Q2 whose emitters are connected to each other; a constant current transistor Q3 and its emitter resistor Re1 that are connected to common emitters of the transistors Q1 and Q2; collector resistors Rc1 and Rc2 connected between the collectors of the differential transistors Q1 and Q2 and a power voltage terminal Vcc; DC cutoff capacitors C1 and C2 for transferring output of an amplifier, that is, only AC elements of collector voltages of the differential transistors Q1 and Q2 to an amplifier of a next stage; a smoothing capacitor C0 connected between the common emitter of the differential transistors Q1 and Q2 and a ground point that is charged by a current rectified by the Q1 and Q2 and holds detection voltage; a coupling capacitor C3 connected between the base and collector of the constant current transistor Q3; and a coupling capacitor C4 connected between the emitter of the constant current transistor Q3 and the ground point.

Differential radio frequency signals RFin and /RFin corresponding to the output power of a power amplifier taken out by a coupler or the like are inputted to the base terminals of the differential transistors Q1 and Q2, and bias voltage Vbias giving an operating point is applied from a bias voltage generating circuit 116. By this operation, collector currents of Q1 and Q2 increase or decrease, the smoothing capacitor C0 is alternately charged by the collector currents, and detection voltage obtained through full-wave rectification for RFin is generated.

In the dummy amplifier D-AMP, as shown in FIG. 3, Q2 of the differential transistors Q1 and Q2 of the differential amplifier of FIG. 2 is omitted to use only the transistor Q1, and the collector resistor Rc is omitted. The base terminal of the transistor Q1 of the dummy amplifier D-AMP is applied with only the same bias potential Vbias as that of the input differential transistors Q1 and Q2 of the amplifiers of the rectifying detection part 111, and does not admit the radio frequency signals RFin and /RFin corresponding to the output power of a power amplifier taken out by a coupler or the like.

In this embodiment, in the amplifier AMP4 of the last stage of the rectifying detection part 111 and the differential amplifier AMP0 provided in parallel, the collector resistors Rc1 and Rc2 provided in the differential amplifier shown in FIG. 2 are excluded, the collectors of the differential transistors Q1 and Q2 are directly connected to the power voltage terminal Vcc, and the DC cutoff capacitors C1 and C2 are not provided (not shown in the drawing). The reason that the DC cutoff capacitors C1 and C2 are not provided is that the amplifiers AMP4 and AMP0 have no amplifier of a next stage. Furthermore, in this embodiment, to make temperature characteristics almost identical, the differential amplifiers AMP0 to AMP4 of the rectifying detection part 111 have the same circuit construction, except the collector resistors Re1 and Re2 and the DC cutoff capacitors C1 and C2, and further use the transistors of same size and same collector resistance values.

Besides the above-mentioned differential amplifiers AMP0 to AMP4, a bias circuit 115 and a bias voltage generating circuit 116 are provided. The bias circuit 115 gives specified bias to the base of the constant current transistor Q3 to supply an operating current to the differential amplifiers. The bias voltage generating circuit 116 applies DC bias potential Vbias of e.g., 2.2V as an operating point to the bases of the differential transistors Q1 and Q2. These bias circuits 115 and 116 are provided as circuits common to the differential amplifiers AMP1 to AMP4, and AMP0, and the dummy amplifier D-AMP. The bias circuit 115 comprises: a reference current source RIS that supplies a reference current Iref; a transistor Q4 that supplies the reference current Iref as a collector current; and its emitter resistor Re2.

Figure 9:
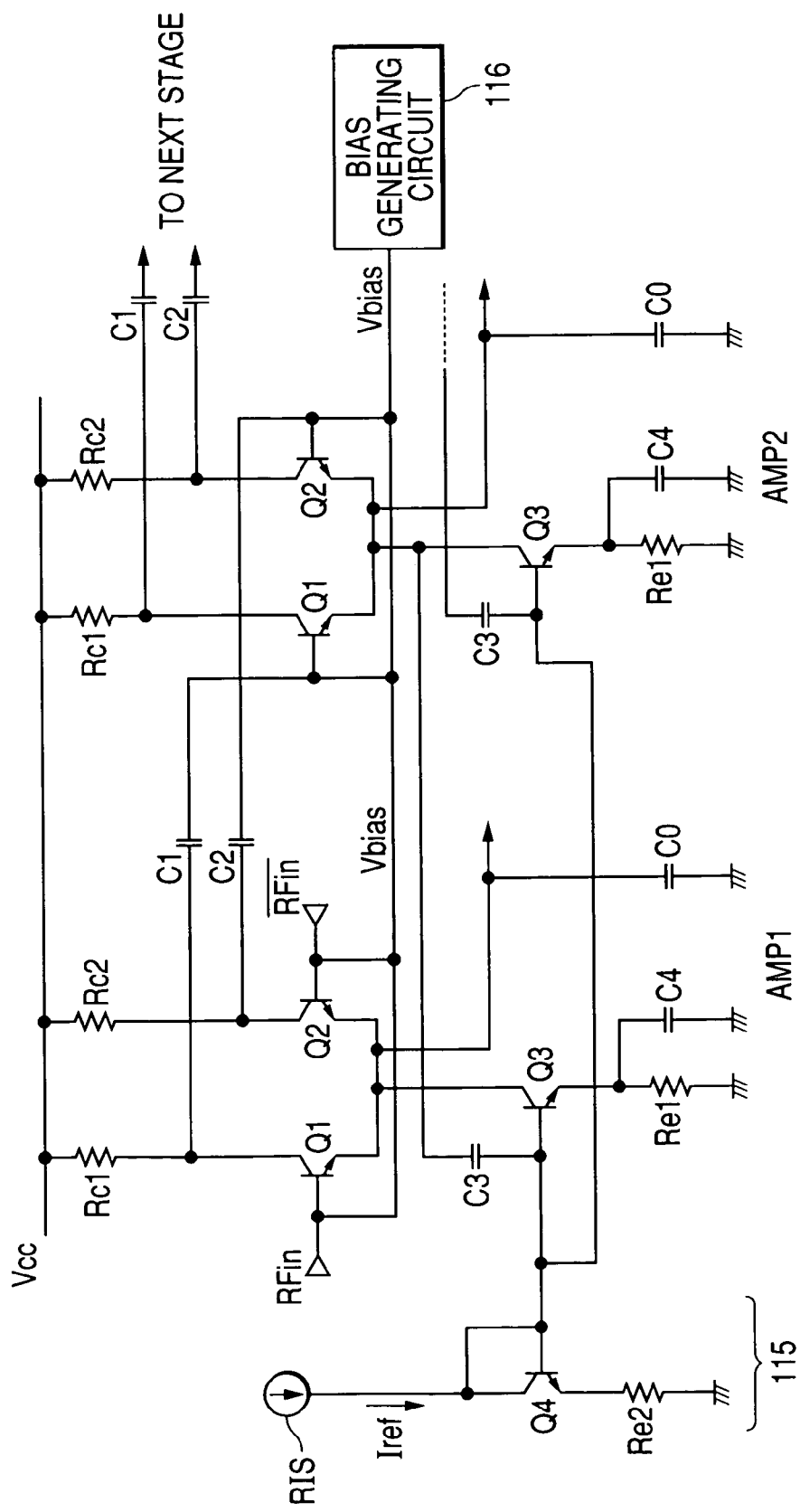
FIG. 9 is a circuit diagram showing a variant of the operational amplifier of the embodiment of FIG. 2.

The transistor Q4 of the bias circuit 115 has so-called diode connection construction in which the base and the collector are coupled, and the base terminal is connected to the base terminal of the constant current transistor Q3 of the differential amplifiers AMP0 to AMP4 and the dummy amplifier D-AMP to constitute a current mirror circuit (see FIG. 9). By this construction, the constant current transistor Q3 of the amplifiers is supplied with a current proportional to the reference current Iref according to a size ratio between Q4 and Q3 (particularly an emitter size ratio).

The bias voltage generating circuit 116 can be constituted by a constant voltage circuit that does not have temperature dependence and power supply voltage dependence such as a band gap reference circuit. When having such a constant voltage circuit, the reference current source RIS can be constituted by a bipolar transistor that receives voltage generated by the constant voltage circuit in the base terminal and supplies a proportional current. The reference current source RIS and the bias voltage generating circuit 116 may be mounted on the same semiconductor chip on which the detection circuit 110 is mounted. However, alternatively, an external terminal that supplies the reference current Iref and an external terminal that applies bias potential Vbias may be provided to give them from outside the chip.

Figure 12:
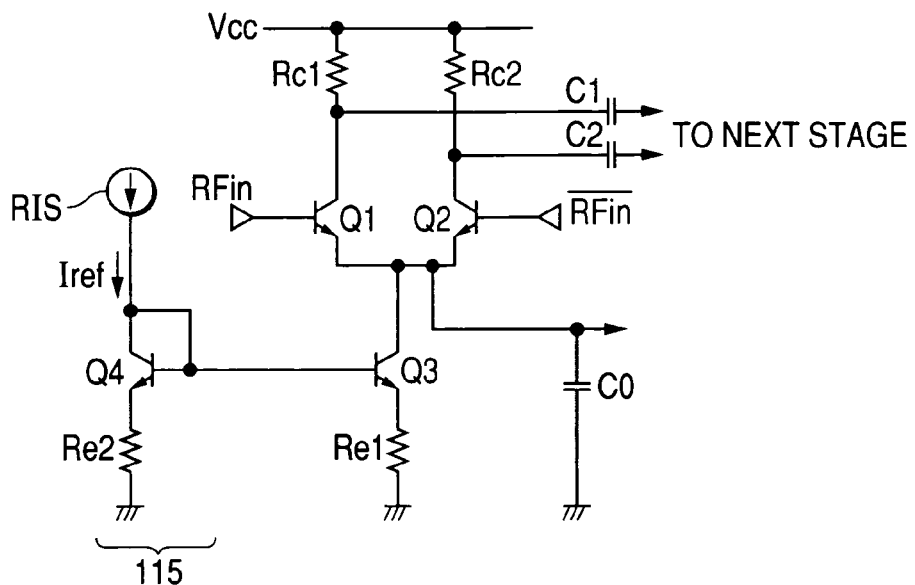
FIG. 12 is a circuit diagram showing the construction of a differential amplifier used in a transmission power detection circuit studied prior to the present invention.
Figure 13:
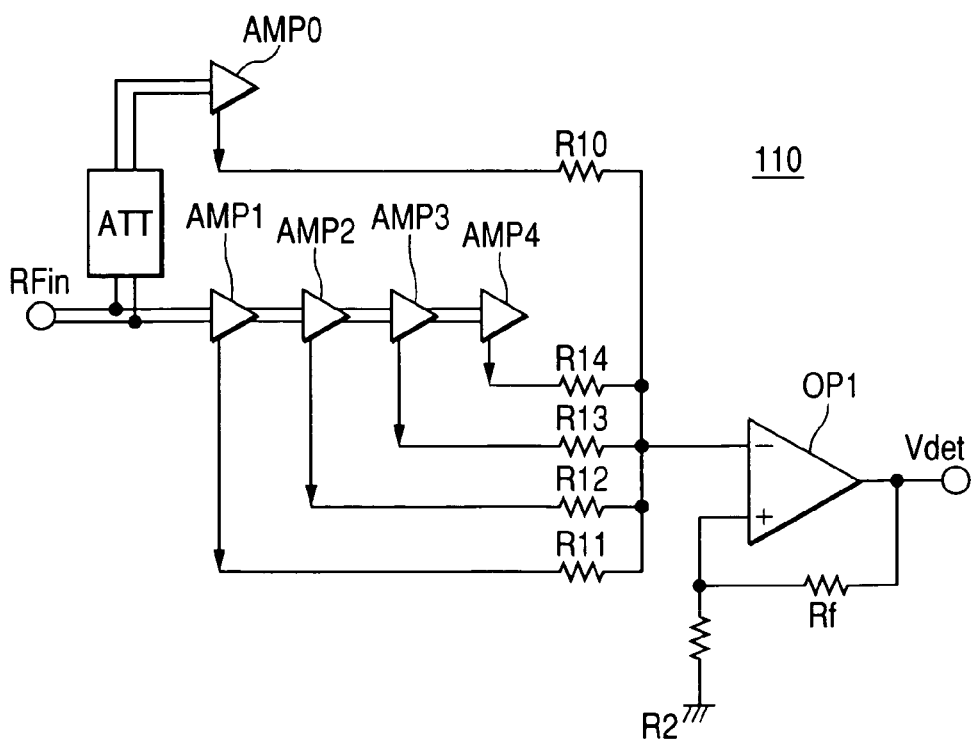
FIG. 13 is a circuit diagram showing the construction of a transmission power detection circuit studied prior to the present invention.

In the differential amplifier of FIG. 2, as input power becomes larger, it is likely that detection voltage becomes higher and a collector voltage of the constant current transistor Q3 becomes higher, sensitivity becomes lower, and linearity becomes lower. However, a coupling capacitor C3 is connected between the base and collector of Q3. By this construction, the coupling capacitor C3 transfers a rise in detection voltage to the base of Q3 to increase base bias, with the result that detection sensitivity can be increased, thereby increasing linearity. The coupling capacitor C4 connected between the emitter of the constant current transistor Q3 and ground lowers AC impedance of the emitter of the constant current transistor Q3 to increase gain, and increases sensitivity. These coupling capacitors C3 and C4 may be omitted to use amplifiers having the same circuit construction as shown in FIG. 12.

Figure 4:
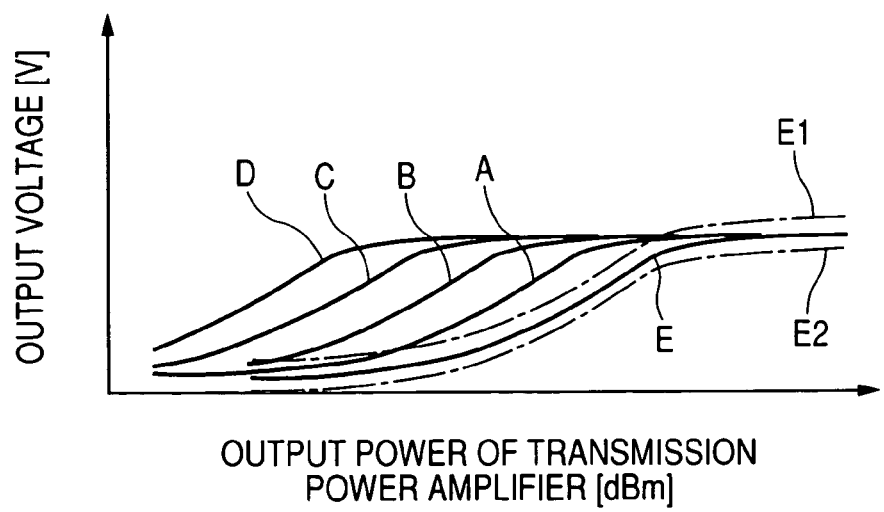
FIG. 4 is a graph showing the relationship between input of the differential amplifiers in the detection circuit of the embodiment of FIG. 1 and output voltages.
Figure 5:
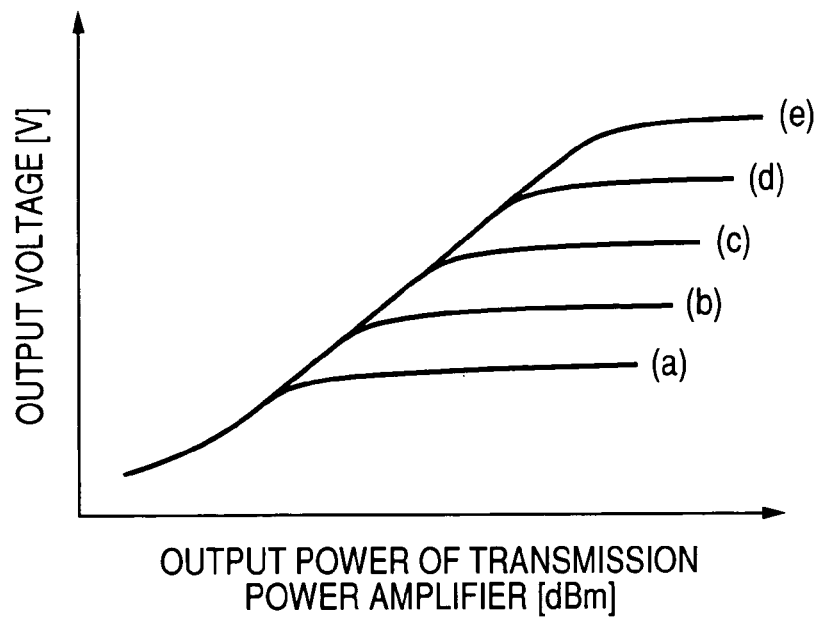
FIG. 5 is a graph showing the relationship between input and synthesized output voltages in the detection circuit of the embodiment of FIG. 1.

FIG. 4 shows the respective characteristics of output voltage for input power of the amplifiers AMP0 to AMP4 in the detection circuit of FIG. 1 that uses the differential amplifiers having the construction shown in FIG. 2. FIG. 5 shows the characteristics of voltages obtained by synthesizing the outputs of the amplifiers for input power. In FIG. 4, the symbol E designates the characteristic of the differential amplifier AMP0; the symbol A, the characteristic of the differential amplifier AMP1; the symbol B, the characteristic of the differential amplifier AMP2; the symbol C, the characteristic of the differential amplifier AMP3; and the symbol D, the characteristic of the differential amplifier AMP4.

In FIG. 5, the symbol (a) designates the characteristic of the differential amplifier AMP4; the symbol (b), the characteristic of a synthesis of outputs of the differential amplifiers AMP3 and AMP4; the symbol (c), the characteristic of a synthesis of outputs of the differential amplifiers AMP2, AMP3, and AMP4; the symbol (d), the characteristic of a synthesis of outputs of the differential amplifiers AMP1 to AMP4; and the symbol (e), the characteristic of a synthesis of outputs of the differential amplifiers AMP1 to AMP4, and output of AMP0.

The characteristic of the individual amplifiers is almost the same as that of the amplifier AMP1 of a first stage. In FIG. 4, the characteristic B of the differential amplifier AMP2 is toward lower power than the characteristic A of the differential amplifier AMP1. This is because a signal amplified by the differential amplifier AMP1 is inputted to the differential amplifier AMP2, which performs amplification operation at a lower input power level than the differential amplifier AMP1. The same is also true for the differential amplifiers AMP3 and AMP4.

The characteristic E of the differential amplifier AMP0 connected in parallel is toward higher power than the characteristic A of the differential amplifier AMP1. This is because an attenuator is provided in the input of the differential amplifier AMP0 to suppress the level of input signals. By this construction, the differential amplifier AMP0 exhibits excellent linearity in regions of higher power than the amplifiers AMP1 to AMP4. As shown in FIG. 5, it will be appreciated that by synthesizing outputs of all amplifiers, the linearity of output becomes satisfactory throughout regions from low power to high power.

Figure 6:
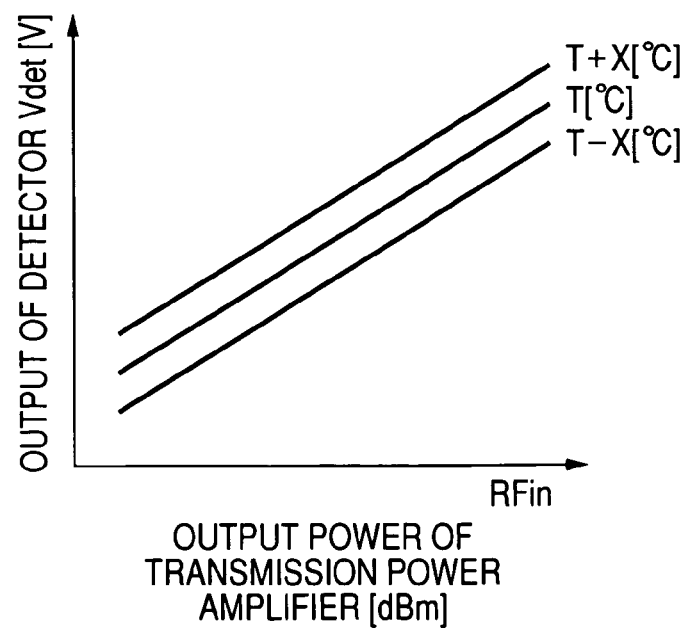
FIG. 6 is a graph showing the temperature dependence of synthesized output voltages when a dummy amplifier is not provided in the detection circuit of the embodiment of FIG. 1.
Figure 7:
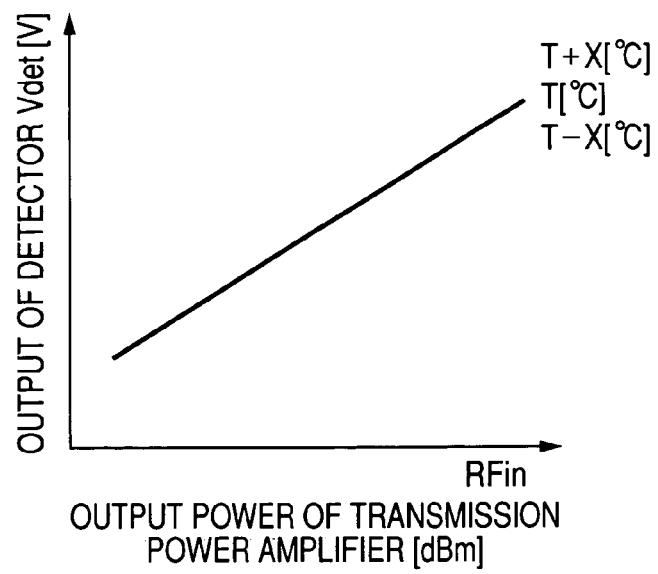
FIG. 7 is a graph showing the temperature dependence of synthesized output voltages in the detection circuit of the embodiment of FIG. 1 in which a dummy amplifier is provided.

Furthermore, although the reference current Iref is a current having not temperature dependence in this embodiment, the characteristic of the differential amplifier AMP0 fluctuates due to temperatures as shown by the broken lines E1 and E2 because of the temperature characteristic of the collector resistors and the transistors. The characteristics of other amplifiers AMP1 to AMP4 also fluctuate due to temperatures like E1 and E2 though not shown in the drawings. As a result, output Vdet of the detection circuit of FIG. 1 fluctuates due to temperatures as shown in FIG. 6. However, since the detector circuit of FIG. 1 provides the dummy amplifier D-AMP to cancel the temperature dependence of the differential amplifiers AMP0 to AMP4 by the temperature dependence of the dummy amplifier, the detection output Vdet being synthesized output exhibits characteristic free of temperature dependence as shown in FIG. 7.

In this embodiment, the resistance values of the resistors R10 to R14 at the output ends of the differential amplifiers AMP0 to AMP4 are respectively set to different values to increase the linearity of output of the entire detection circuit. Thus setting the resistors at the output ends to different resistance values for different amplifiers makes the temperature characteristic of output of each amplifier different for each of the amplifiers. However, discrepancies among the temperature characteristics of outputs of the operational amplifiers AMP0 to AMP4 due to differences among the resistance values of the resistors R10 to R14 at the output ends of the amplifiers are smaller than discrepancies of the temperature characteristics of outputs of the amplifiers due to differences among the resistance values of the collector resistors within the amplifiers.

According to the method described previously, the resistance values of the collector resistors within the amplifiers are changed to increase the linearity of output, and temperature dependence of output occurring due to the collector resistors is canceled by temperature dependence provided to a constant power source. On the other hand, according to the method in this embodiment, the resistance values of the resistors R10 to R14 at the output ends of the amplifiers AMP0 to AMP4 are changed to increase linearity, and the temperature dependence of output occurring due to the collector resistors within the amplifiers is canceled by the temperature dependence of output of the dummy amplifier D-AMP and adjustments of coefficient values in the coefficient circuit. Therefore, the latter has a greater merit than the former in that output linearity decreases a little, but the number of constant current source can be decreased, so that the circuit can be scaled down to reduce current consumption.

Figure 8:
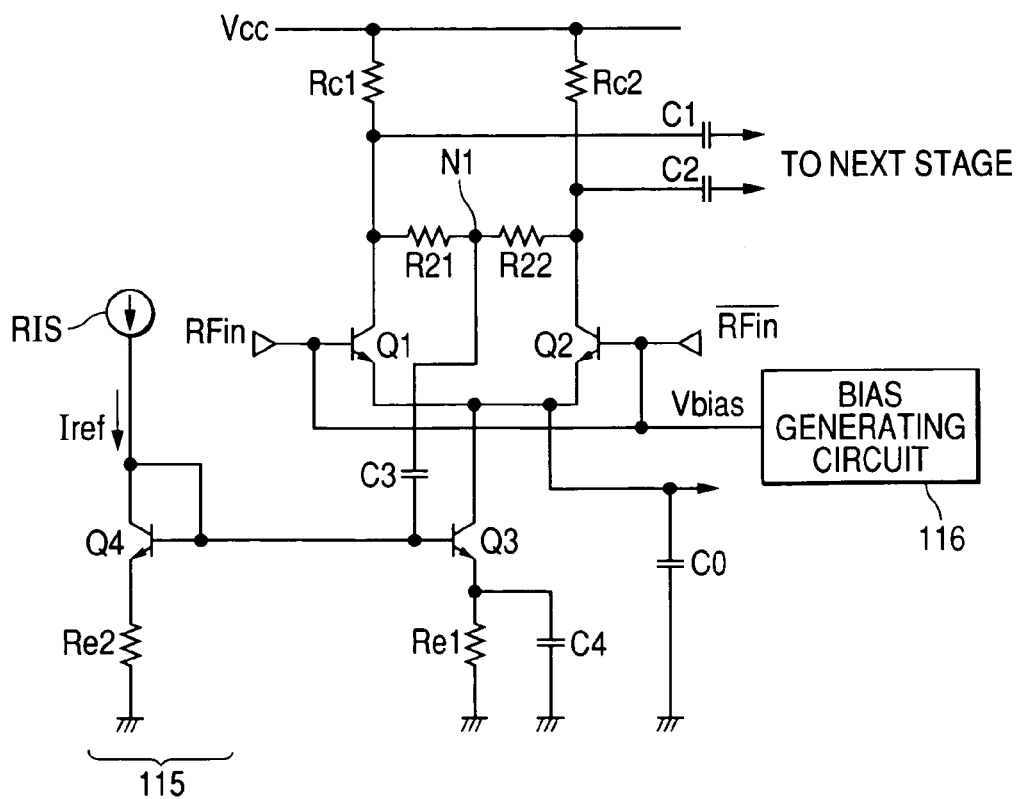
FIG. 8 is a circuit diagram showing a variant of the operational amplifier of the embodiment of FIG. 2.

FIG. 8 shows a variant of the operational amplifier in FIG. 2 suitably used in the detection circuit of the present invention.

According to this variant, in the differential amplifier of FIG. 2, the coupling capacitor C3 provided between the common emitter of the differential transistors Q1 and Q2 and the base of the constant current transistor Q3 is connected between a connection node N1 of resistors R21 and R22 connected between the collectors of the differential transistors Q1 and Q2 and the base of the constant current transistor Q3. Also in this variant, as detection voltage or the charging voltage C0 of a smoothing capacitor C0 becomes high and the emitter potential of the differential transistors Q1 and Q2 become high, the collector potential of Q1 and Q2 become high. Therefore, like the differential amplifier of FIG. 2, the coupling capacitor C3 transfers a rise in detection voltage to the base of Q3 to increase base bias, so that detection sensitivity can be raised to increase linearity.

FIG. 9 shows a second embodiment of the differential amplifier in FIG. 2.

According to this variant, in the differential amplifier of FIG. 2, the coupling capacitor C3 provided between the common emitter of the differential transistors Q1 and Q2 and the base of the constant current transistor Q3 is connected between the common emitter of the differential transistors Q1 and Q2 of a differential amplifier of a subsequent stage and the base of the constant current transistor Q3 of a preceding stage.

Like the differential amplifier of FIG. 2, since detection voltage rises as input power increases, as in this variant, by connecting the coupling capacitor C3 between the common emitter of the differential transistors Q1 and Q2 of a differential amplifier of a subsequent stage and the base of the constant current transistor Q3 of a preceding stage, the base potential of the constant current transistor Q3 is raised to further increase detection sensitivity, so that linearity can be increased.

A location in which the coupling capacitor C3 is connected is not limited to the common emitter of the differential transistors Q1 and Q2 of a differential amplifier of a next stage. It may also be the common emitter of the differential transistors Q1 and Q2 of a differential amplifier of a third or fourth stage. Furthermore, the coupling capacity C3 may be connected between the base of the constant current transistor Q3 of a differential amplifier of a second stage and the common emitter of the differential transistors Q1 and Q2 of a differential amplifier of a third or fourth stage.

Figure 10:
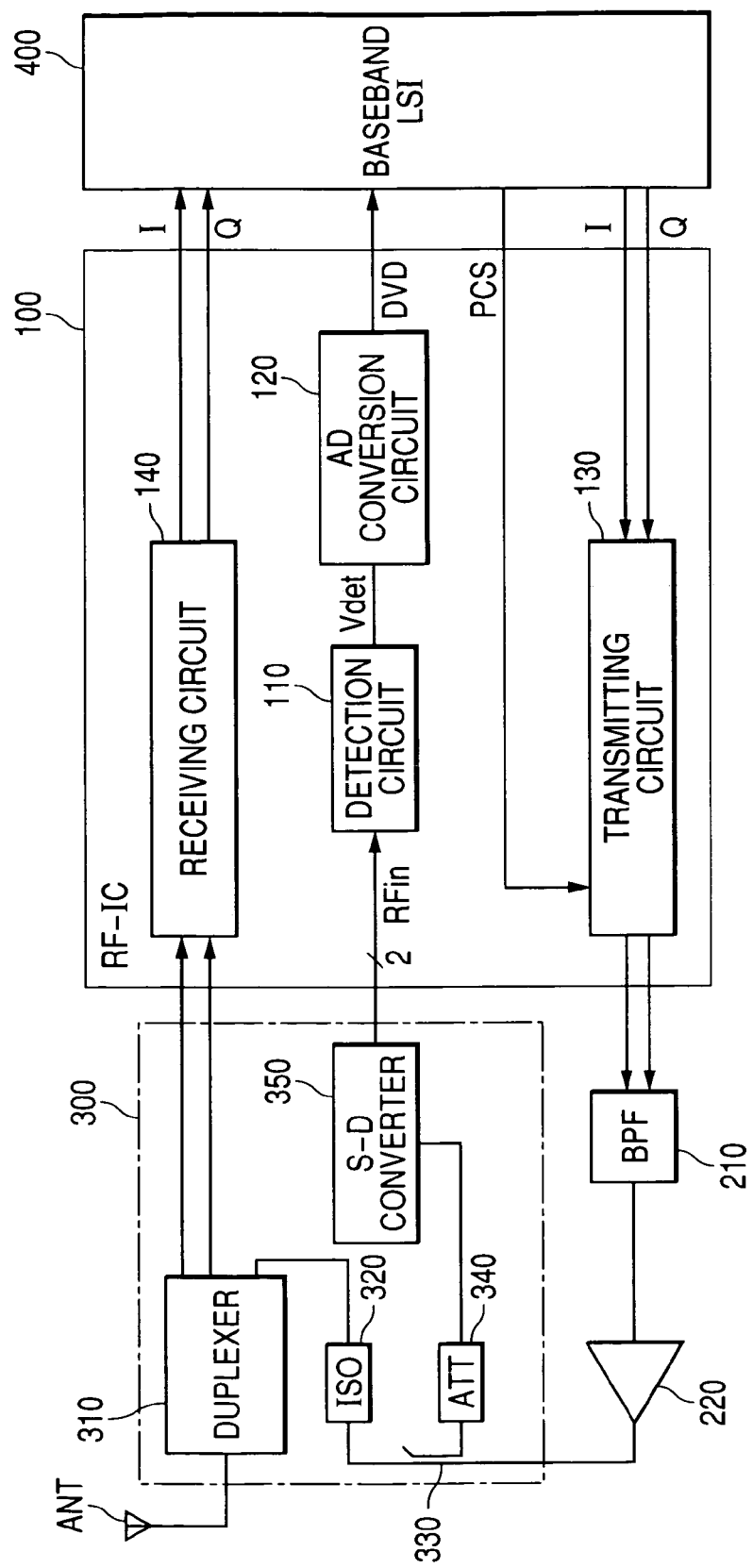
FIG. 10 is a block diagram showing an example of a wireless communication system to which the detection circuit of the embodiment is effectively applied.

FIG. 10 shows an outline construction of a communication system capable of wireless communication of WCDMA (wideband CDMA) system as an example of a wireless communication system to which the detection circuit of the above-mentioned embodiment is effectively applied. In this application, the transmission power detection circuit 110 of the above-mentioned embodiment is provided in a radio frequency processing circuit having a modulating/demodulating function for a transmitting/receiving signal.

In FIG. 10, ANT designates an antenna for transmitting and receiving a signal wave. 100 designates a radio frequency semiconductor integrated circuit (RF-IC) including a transmission power detection circuit 110 of the above-mentioned embodiment, an AD conversion circuit 120 that converts detection voltage Vdet of the transmission power detection circuit 110 into a digital signal, a transmitting circuit 130 that modulates and up-converts transmission signals (I and Q signals), and a receiving circuit 140 that down-converts a received signal for demodulation to generate I and Q signals. 210 designates a band pass filter that eliminates an unnecessary wave from a transmission signal outputted from RF-IC. 220 designates a radio frequency power amplifier that power amplifies a modulated transmission signal. 300 designates a front end module provided between the radio frequency power amplifier 210 and the antenna. 400 designates a baseband circuit (baseband LSI) that generates I and Q signals based on transmission data (baseband signal), and generates a control signal PCS for a variable gain amplifier provided within, e.g., the transmitting circuit 130 of the RF-IC 100 and supplies it to the RF-IC 10.

The radio frequency power amplifier 210 is constructed as a module (electronic part) on which a power amplifier and externally mounted elements of the power amplifier are mounted on an insulating board, wherein the power amplifier is made into a semiconductor integrated circuit including an amplification transistor, a bias circuit, and the like, and the externally mounted elements denote a capacitance element for DC cutoff and an inductance element for impedance matching. A module referred to in this specification is an object in which plural semiconductor chips and discrete parts are mounted on an insulating board such as a ceramic board for which printed wiring is performed surficially and internally, and individual parts are constructed so as to be handleable as one electronic part by being coupled by the printed wiring and bonding wires so that they play specified roles.

In a communication system of the WCDMA system, plural terminals (cellular phones) communicate at the same time using an identical frequency channel. Therefore, in a base station, when a transmission signal from a terminal is smaller than signals from other terminals, the signal of the terminal is buried in the large signals of the other terminals and becomes indistinguishable, causing reduction in frequency use efficiency. Yet, when a certain terminal has transmitted in excess of a specified maximum transmission level, all terminals within a cell that use an identical frequency channel may become incapable of performing communications.

Accordingly, according to the specifications of WCDMA, a base station indicates power levels to individual terminals (increases or decreases power) so that signals from terminals are at the same level, while the terminals performs detailed transmission control every one slot (667 μs). However, in such power control, the indication from the base station is only power increase or decrease information and contains no concrete transmission level information. Therefore, when the base station successively sends a power increase indication, a terminal having received it might make output in excess of maximum transmission power.

To avoid such as situation, that is, to prevent the individual terminals from performing transmission in excess of a maximum transmission level, a function to limit output power (restrictor function) is required. The limiter function comprises a detection function for detecting a transmission level of a terminal, and a function for controlling power using the detection signal. In the system of FIG. 10, the detection function for detecting a transmission level is provided within the RF-IC 100, and the power control function is provided in the baseband LSI 400.

Specifically, detection voltage Vdet by the transmission power detection circuit 110 provided in the RF-IC 100 is A/D-converted in the AD conversion circuit 120 before being inputted to the baseband LSI 400. The baseband LSI 400 determines a transmission level on the basis of detection voltage data DVD, and compares a power increase or decrease indication from a base station and a current transmission level. If power increase is indicated and a maximum transmission level is not exceeded, the baseband LSI 400 sends such a control signal as to increase output power to the variable gain amplifier within the transmitting circuit 130, and if a maximum transmission level is exceeded, it sends such a control signal PCS as not to increase output power to the variable gain amplifier.

In the system 10 of FIG. 10, a front end module 300 comprises: a duplexer 310 (demultiplexer) that separates a transmission signal and a received signal; an isolator 320 that blocks transmission of DC voltage; a coupler 330 that takes out AC signals from output power of the power amplifier 220; an attenuator 340 that attenuates a signal taken out by the coupler 330; and a single differential converter 350 that converts a single-phase AC signal into a differential AC signal 180 degrees out of phase with each other. The duplexer 310 also functions as a filter that eliminates signals of unnecessary frequencies from a signal received from the antenna ANT.

Instead of providing the coupler 330, the attenuator 340, and the single differential converter 350 in the front end module 300, they may be mounted on an insulating board such as a ceramic board together with the power amplifier 220 so that they are configured as a module (power module). The AD conversion circuit 120 that converts detection voltage Vdet of the transmission power detection circuit 110 into a digital signal may be provided in the baseband LSI 400 not in the RF-IC 100, or may be configured as a separate IC. A capacitance element or the like may be used in place of the coupler 330 that takes out AC signals from output power of the power amplifier 220. Furthermore, when a multiband wireless communication system capable of communications of the WCDMA system and the GSM system is configured, a signal changeover switch (so-called antenna switch) is provided between the duplexer 310 and the antenna ANT.

Figure 11:
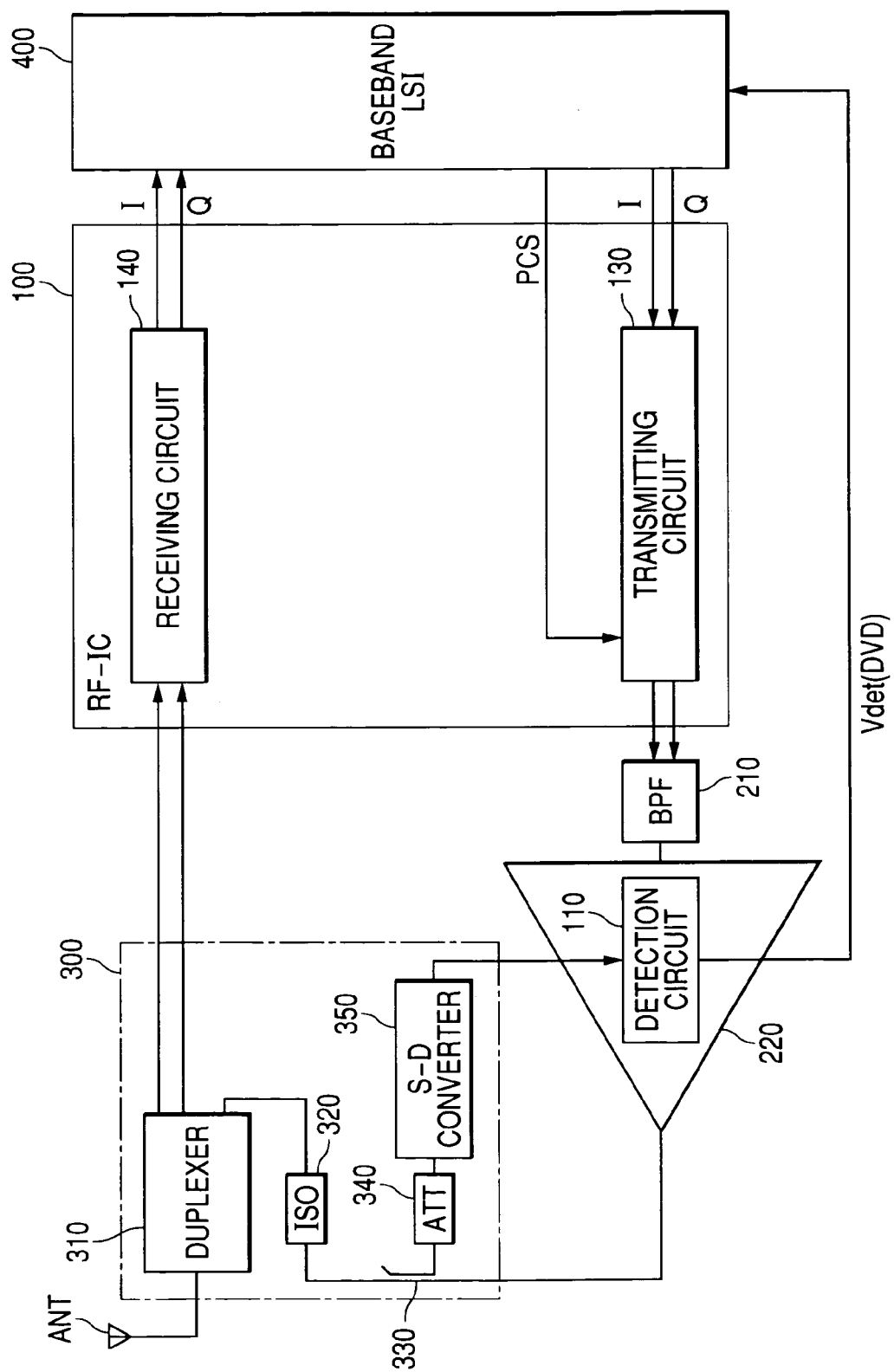
FIG. 11 is a block diagram showing another example of a wireless communication system to which the detection circuit of the embodiment is effectively applied.

FIG. 11 shows another application of a wireless communication system to which the detection circuit of the above-mentioned embodiment is effectively applied. In this application, the transmission power detection circuit 110 of the above-mentioned embodiment is provided in the power amplifier 220 that power amplifies a transmission signal. It is understood that circuits and parts in FIG. 11 that are identical to those in FIG. 10 are identified by the same reference numerals, and duplicate descriptions are omitted.

In this application, the power amplifier 220 and the detection circuit 110 that detects its output power may be formed on one semiconductor chip as a semiconductor integrated circuit (IC). However, since the power amplifier 210 consumes a large amount of power and is apt to become hot, it is desirable that the transmission power detection circuit 110 is formed as an independent IC or provided as an IC formed on a semiconductor chip together with a bias control circuit in the vicinity of the power amplifier, and is mounted as a power module on an insulating board together with ICs and capacitors constituting the power amplifier 220.

Particularly, when the transmission power detection circuit 110 is constituted by amplifiers comprising bipolar transistors as shown in FIG. 2, and the power amplifier 220 is constituted by MOSFET, preferably they may be constituted as separate ICs to reduce chip costs. In this application, detection voltage Vdet of the transmission power detection circuit 110 is inputted to the baseband LSI 400 without passing through the RF-IC 100. The AD conversion circuit that converts detection voltage Vdet of the detection circuit 110 into a digital signal may be provided in any of the power module or baseband LSI 400, or constituted as a separate IC.

Also in this application, the coupler 330, the attenuator 340, the single differential converter 350 may be provided in the front end module 300. However, they may also be provided in a module mounted with the power amplifier 220 and the transmission power detection circuit 110. Furthermore, although not shown, the detection circuit 110 that detects output power of the power amplifier 220 may be constituted as a separate electronic part (IC) independent of the power amplifiers or the power module.

Hereinbefore, although the invention made by the inventors of the present invention has been described in detail based on the preferred embodiments, it goes without saying that the present invention is not limited to the preferred embodiments, and may be modified in various ways without changing the main purport of the present invention. For example, in this embodiment, as the dummy amplifier D-AMP, Q2 of the differential transistors Q1 and Q2 of the differential amplifier constituting the rectifying detection part is omitted to use only the transistor Q1, and the collector resistors Rc1 and Rc2 are omitted. However, the collector resistor Rc1 may be provided between the collector of the transistor Q1 of FIG. 3 and the power voltage Vcc.

In the above-mentioned embodiments, in the amplifier AMP4 of the last stage of the rectifying detection part 111 and the differential amplifier AMP0 provided in parallel, the collector resistors Rc1 and Rc2 provided in the differential amplifier shown in FIG. 2 are excluded, and the collectors of the differential transistors are directly connected to the power voltage terminal. However, the amplifiers AMP4 and AMP0 may also have the collector resistors Rc1 and Rc2.

Furthermore, in the embodiment of FIG. 1, the rectifying detection part 111 may be constituted by an amplifier train including four amplifiers, and one parallel amplifier. However, only the four amplifiers AMP1 to AMP4 with the parallel amplifier AMP0 excluded may be connected in series, or the amplifier train may comprise three or five or more amplifiers not four. Although the compensation voltage generating circuit 112 described above comprises one dummy amplifier D-AMP and a coefficient circuit (R1, R2), a compensation voltage generating circuit may be used which comprises a dummy amplifier train comprising as many amplifiers as there are amplifiers in the amplifier train of the rectifying detection part 111, one parallel amplifier corresponding to AMP0, and synthesizing resistors corresponding to the R10 to R14.

In the above-mentioned embodiments, as amplifiers constituting the rectifying detection part 111, a differential amplifier including differential transistors of which emitters are connected in common is used. However, like the dummy amplifier shown in FIG. 3, an emitter follower type amplifier having only the transistor Q1 may be used. In this case, the rectifying detection part 111 performs half wave rectification, but the single differential converter circuit 350 shown in the FIG. 10 is not required.

The foregoing description centers on the case where the invention made by the inventors is applied to a detection circuit of output power in a wireless communication system capable of transmission and reception by the WCDMA system, which is an application field as a background of the invention. However, the present invention is not limited to it, and can be used in cellular phones and mobile telephones capable of other communication systems such as CDMA and GSM systems, or a transmission power detection circuit constituting wireless communication systems such as wireless LAN.

What is claimed is:

1. A wireless communication system comprising:
   a radio frequency power amplifier which amplifies a transmission signal;
   a transmission power detection circuit which detects a transmission power of the transmission signal that amplified by the radio frequency power amplifier; and
   a control circuit which receives information on a transmission level from a base station to control transmission power and which restricts an increase in the transmission power when judging from a detection output detected by the transmission power detection circuit that transmission power exceeds specified maximum transmission power,
   wherein the transmission power detection circuit comprises:
   a rectifying detection part that comprises plural differential amplifiers coupled in series that each include a differential transistor pair of which emitters are connected in common and to the base terminals of which a signal to be detected is inputted, and smoothing capacitors each coupled to common emitter terminals of a differential transistor pair constituting each differential amplifier;
   a dummy amplifier having a construction similar to the differential amplifiers;
   a coefficient circuit that generates a first voltage obtained by multiplying emitter voltage of differential transistors of the dummy amplifier by a prescribed coefficient; and
   a subtraction circuit that generates a second corresponding to the difference between a third voltage obtained by synthesizing outputs detected by the plural differential amplifiers and the first voltage adjusted by the coefficient circuit,
   wherein the transmission power detection circuit is increased in the linearity of the detection output over a wider range by the plural differential amplifiers connected in series than by a single differential amplifier, and outputs the second voltage obtained by compensating the temperature dependence of the differential amplifiers by the temperature dependence of the dummy amplifier from the subtraction circuit.

2. The wireless communication system according to claim 1,
   wherein the coefficient of the coefficient circuit is set according to the number of differential amplifiers connected in series of the rectifying detection part.

3. The wireless communication system according to claim 2,
   wherein the rectifying detection part further includes a differential amplifier provided in parallel with the plural differential amplifiers connected in series.

4. The wireless communication system according to claim 3,
   wherein a signal attenuating means is provided between an AC signal extracting means for taking out an AC component of output of the radio frequency power amplifier and input terminals of the differential amplifier provided in parallel.

5. The wireless communication system according to any of claim 1,
   wherein a single differential conversion means that converts a single-phase signal into a differential signal is provided between the AC signal extracting means for taking out an AC component of output of the radio frequency power amplifier and an input terminal of the rectifying detection part.

6. The wireless communication system according to any of claim 1,
   wherein the smoothing capacitor is provided in each of the plural differential amplifiers.

7. The wireless communication system according to claim 1,
   wherein the differential amplifier includes a constant current transistor that is connected to common emitter terminals of the differential transistor pair and supplies an operating current to the differential transistors, and a current not having temperature dependence is supplied to the constant current transistor.

8. The wireless communication system according to any of claim 1,
   wherein the radio frequency power amplifier is constructed as an electronic part which includes a power amplifier circuit that is formed on a semiconductor integrated circuit, and the monolithic elements of the power amplifier circuit, the power amplifier circuit and the monolithic elements being mounted on an insulating board, and
   wherein the transmission power detection circuit is mounted on the insulating board together with the power amplifier circuit.

9. A semiconductor integrated circuit including a detection circuit, the detection circuit comprising:
   a rectifying detection part that comprises plural differential amplifiers coupled in series that each include a differential transistor pair of which emitters are connected in common and to the base terminals of which a signal to be detected is inputted, and smoothing capacitors each coupled to common emitter terminals of a differential transistor pair constituting each differential amplifier;
   a dummy amplifier having a construction similar to the differential amplifiers;
   a coefficient circuit that generates a first voltage obtained by multiplying emitter voltage of differential transistors of the dummy amplifier by a prescribed coefficient; and
   a subtraction circuit that generates a second voltage corresponding to the difference between a third voltage obtained by synthesizing outputs detected by the plural differential amplifiers and the first voltage adjusted by the coefficient circuit,
   wherein the detection circuit is increased in the linearity of a detection output of the detection circuit over a wider range by the plural differential amplifiers connected in series than by a single differential amplifier, and outputs the second voltage obtained by compensating the temperature dependence of the differential amplifiers by the temperature dependence of the dummy amplifier from the subtraction circuit.

10. The semiconductor integrated circuit according to claim 9,
    wherein the coefficient of the coefficient circuit is set by a ratio of resistances.

11. The semiconductor integrated circuit according to claim 9,
    wherein the rectifying detection part further includes a differential amplifier provided in parallel with the plural differential amplifiers connected in series.

12. The semiconductor integrated circuit according to claim 11, wherein an attenuating means is provided in a preceding stage of the differential amplifier provided in parallel with the plural differential amplifiers.

13. The semiconductor integrated circuit according to claim 9,
wherein the differential amplifier includes a constant current transistor that is coupled to common emitter terminals of the differential transistor pair and supplies an operating current to the differential transistors, and a first capacitance element for increasing sensitivity is coupled between the base and collector of the constant current transistor.

14. The semiconductor integrated circuit according to claim 13,
wherein a second capacitance element is coupled between the emitter of the constant current transistor and ground.

15. The semiconductor integrated circuit according to claim 9,
wherein the dummy amplifier has one transistor of a differential transistor pair.

16. The semiconductor integrated circuit according to claim 14,
wherein the dummy amplifier has one transistor of a differential transistor pair, and a collector terminal of the transistor is directly connected to a power voltage terminal.

17. A semiconductor integrated circuit incorporating:
a transmitting circuit that has a function for modulating a transmission signal and a function for up-converting a transmission signal;
a receiving circuit that has a function for down-converting a received signal and a function for demodulating a received signal; and
a detection circuit including: a rectifying detection part that comprises plural differential amplifiers connected in series that each include a differential transistor pair of which emitters are connected in common and to the base terminals of which a signal to be detected is inputted, and smoothing capacitors each connected to common emitter terminals of a differential transistor pair constituting each differential amplifier; a dummy amplifier having a construction similar to the differential amplifiers; a coefficient circuit that generates a first voltage obtained by multiplying voltage between terminals corresponding to the common emitter terminals of the dummy amplifier by a prescribed coefficient; and a subtraction circuit that generates a second voltage corresponding to the difference between a third voltage obtained by synthesizing outputs detected by the plural differential amplifiers and the first voltage adjusted by the coefficient circuit, wherein the detection circuit is increased in the linearity of the detection output over a wider range by the plural differential amplifiers connected in series than by a single differential amplifier, and outputs a second voltage obtained by compensating the temperature dependence of the differential amplifiers by the temperature dependence of the dummy amplifier from the subtraction circuit.

* * * * *